United States Patent
Yoshiura et al.

(10) Patent No.: US 11,238,861 B2
(45) Date of Patent: Feb. 1, 2022

(54) FOOD PROCESSING SYSTEM

(71) Applicant: KABUSHIKI KAISHA YASKAWA DENKI, Kitakyushu (JP)

(72) Inventors: Yasufumi Yoshiura, Kitakyushu (JP); Tomohiro Kamishio, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 181 days.

(21) Appl. No.: 16/547,836

(22) Filed: Aug. 22, 2019

(65) Prior Publication Data

US 2020/0075005 A1 Mar. 5, 2020

(30) Foreign Application Priority Data

Aug. 30, 2018 (JP) .............................. JP2018-161432

(51) Int. Cl.
*G10L 15/22* (2006.01)
*G06F 3/01* (2006.01)
(Continued)

(52) U.S. Cl.
CPC ............. *G10L 15/22* (2013.01); *G05B 19/416* (2013.01); *G06F 3/013* (2013.01); *G08B 3/10* (2013.01);
(Continued)

(58) Field of Classification Search
CPC ......... G10L 15/22; G10L 15/00; G10L 15/06; G10L 15/065; G10L 15/16; G10L 15/183; G10L 15/20; G10L 15/24; G10L 15/26; G10L 2015/22; G10L 2015/00; G10L 2015/02; G10L 2015/025; G10L 2015/06; G10L 2015/063; G10L 2015/0635;
(Continued)

(56) References Cited

U.S. PATENT DOCUMENTS

| 6,728,343 B1 * | 4/2004 | Taylor .................. H04M 1/247 379/71 |
| 2015/0279370 A1 * | 10/2015 | Koetz .................. A47J 43/0716 366/241 |

(Continued)

FOREIGN PATENT DOCUMENTS

| JP | 2002-91554 A | 3/2002 |
| JP | 2005-37597 A | 2/2005 |

(Continued)

OTHER PUBLICATIONS

Office Action dated Mar. 27, 2020 in corresponding Japanese Patent Application No. 2018-161432 (with English Translation), 7 pages.
(Continued)

*Primary Examiner* — Qi Han
(74) *Attorney, Agent, or Firm* — Oblon, McClelland, Maier & Neustadt, L.L.P.

(57) ABSTRACT

A food processing system includes a food work device that performs predetermined work on a food, controller circuitry that controls the food work device, a sound input device that receives a sound made by a worker, and sound recognition circuitry that obtains and recognizes the input sound and, based on the recognized input sound, instructs the controller circuitry to control the food work device to perform predetermined processing.

20 Claims, 10 Drawing Sheets

(51) Int. Cl.
  *G08B 21/18* (2006.01)
  *G08B 3/10* (2006.01)
  *G10L 15/08* (2006.01)
  *G05B 19/416* (2006.01)
  *B65B 65/00* (2006.01)
  *A23L 5/10* (2016.01)

(52) U.S. Cl.
  CPC ............ *G08B 21/18* (2013.01); *G10L 15/083* (2013.01); *A23L 5/10* (2016.08); *A23V 2002/00* (2013.01); *B65B 65/003* (2013.01); *G05B 2219/45054* (2013.01); *G10L 2015/223* (2013.01)

(58) Field of Classification Search
  CPC ....... G10L 2015/0638; G10L 2015/223; G10L 2015/225; G10L 2015/226; G10L 2015/228
  USPC .... 704/275, 270.1, 270, 276, 231, 251, 244, 704/255, 257
  See application file for complete search history.

(56) References Cited

U.S. PATENT DOCUMENTS

2017/0084275 A1* 3/2017 Koetz .................... A47J 43/07
2017/0297196 A1   10/2017 Koike et al.

FOREIGN PATENT DOCUMENTS

| JP | 2007-27167 A | 2/2007 |
| JP | 2009-140239 A | 6/2009 |
| JP | 2009-145402 A | 7/2009 |
| JP | 2015-182794 A | 10/2015 |
| JP | 2017-189862 A | 10/2017 |
| JP | 2018-17538 A | 2/2018 |
| WO | WO 2018/147084 A1 | 8/2018 |

OTHER PUBLICATIONS

Korean Office Action dated Jan. 22, 2021 in Korean Patent Application No. 10-2019-0106235 (with English translation), 12 pages.
Office Action dated Dec. 17, 2019 in corresponding Japanese Patent Application No. 2018-161432 (with English Translation), 8 pages.

* cited by examiner ered by the controller. Examples of the automatic work machine

FOOD PROCESSING SYSTEM

CROSS-REFERENCE TO RELATED APPLICATIONS

The present application claims priority under 35 U.S.C. § 119 to Japanese Patent Application No. 2018-161432, filed Aug. 30, 2018. The contents of this application are incorporated herein by reference in their entirety.

BACKGROUND

Field of the Invention

The embodiments disclosed herein relate to a food processing system.

Discussion of the Background

JP 2017-189862A discloses a work line on which a food product is arranged in a food container. The work line includes a conveyor and a work robot. The conveyor conveys the food container. Adjacent to the conveyor, the work robot and a worker are located and arrange the food product in the food container.

SUMMARY

According to one aspect of the present invention, a food processing system includes a food work device that performs predetermined work on a food, controller circuitry that controls the food work device, a sound input device that receives a sound made by a worker, and sound recognition circuitry that obtains and recognizes the input sound and, based on the recognized input sound, instructs the controller circuitry to control the food work device to perform predetermined processing.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
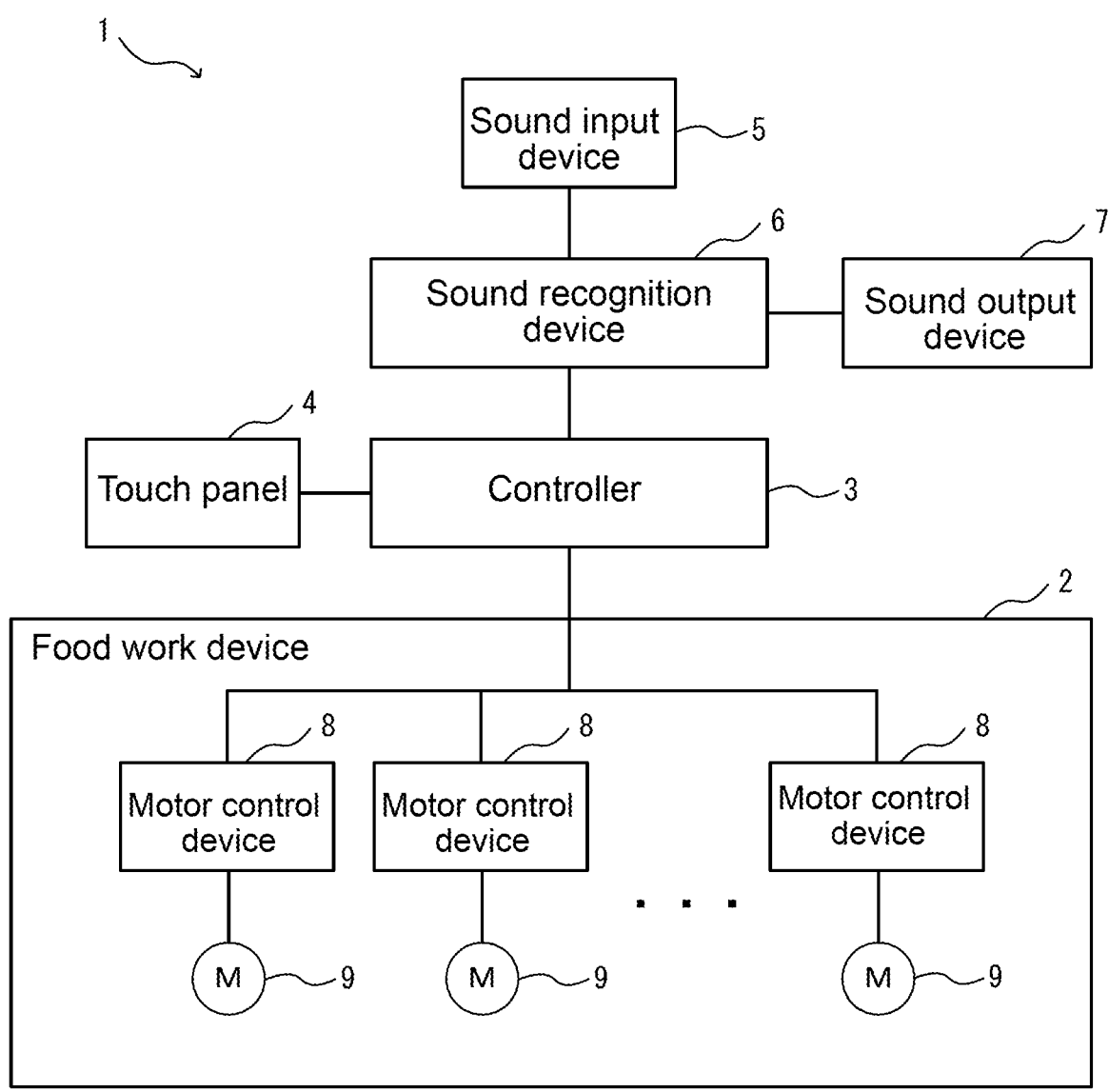
FIG. 1 illustrates an example general arrangement of a food processing system according to this embodiment.

The embodiments will now be described with reference to the accompanying drawings, wherein like reference numerals designate corresponding or identical elements throughout the various drawings.

1. General Arrangement of Food Processing System

By referring to FIG. 1, an example general arrangement of a food processing system 1 according to this embodiment will be described.

As illustrated in FIG. 1, the food processing system 1 includes a food work device 2, a controller 3, a touch panel 4, a sound input device 5, a sound recognition device 6, and a sound output device 7.

The food work device 2 is an automatic work machine that performs predetermined work on a food. As used herein, the term "food" is intended to mean a prepared or processed food product purchased as a "home meal replacement" (which is a form of meal prepared or processed outside a home, brought or delivered to a home, and consumed at a home). Examples of the food include, but are not limited to, a rice ball, a sandwich, a ready-to-eat food product, and a box lunch. Also as used herein, the term "predetermined work" is intended to encompass all the work involved on a production line of a food, examples including, but not limited to, cooking, arrangement, saucing, wrapping, and packing. Also as used herein, the term "automatic work machine" is intended to mean a machine that automatically performs the predetermined work under the control of a controller. Examples of the automatic work machine include, but are not limited to, a vertical multi-articular general-purpose robot, a horizontal multi-articular general-purpose robot, a parallel link general-purpose robot, and a work machine that is dedicated to a particular kind of work and that includes an actuator movable in at least one of XYZθ directions. The food work device 2 includes a plurality of motor control devices 8 and a plurality of motors 9.

The controller 3 is a control device to control the food work device 2, and is implemented by one or a combination of a general-purpose personal computer, a PLC (Programmable Logic Controller), and a motion controller. The controller 3 generates at least one of a position command, a speed command, and a torque command, and transmits the command(s) to the plurality of motor control devices 8. Each of the plurality of motor control devices 8 controls a corresponding motor 9 at a command from the controller 3.

The touch panel 4 (which is a non-limiting example of the display device recited in the appended claims) displays an operation screen associated with an operation of the food work device 2 controlled by the controller 3. The operation screen includes, for example, a main screen, a monitor screen, an automatic operation screen, and an alarm screen. A worker touches a button displayed on any of the screens to make a desired input. It is possible to use, instead of a touch panel, a liquid crystal panel or a similar display device whose only function is a display function. In this case, it is possible to use a separate manipulation terminal such as a keyboard and a pendant.

The sound input device 5 is a device into which voice made by the worker is input (voice is a non-limiting example of the sound recited in the appended claims). A non-limiting example of the sound input device 5 is a microphone. Upon detection of the voice of the worker, the sound input device 5 converts the voice into an electrical signal and transmits the electrical signal to the sound recognition device 6. The sound input device 5 may be mounted on some other element such as the controller 3 and the sound recognition device 6, or may be carried by the worker. In the configuration in which the sound input device 5 is mounted on some other element, the sound input device 5 may be a directional sound concentrating microphone that selectively collects sound from a particular direction or a particular area (a direction or an area in which the worker is located on the food production line). In the configuration in which the sound input device 5 is carried by the worker, the sound input device 5 may be attached to or built in a mask worn by the worker for food sanitary reasons. Alternatively, the sound input device 5 may be a head set, which is a microphone-earphone combination, and mounted on the inner surface of a hood of a food workwear. Also, a sound concentrating microphone is not intended in a limiting sense; another possible example is a bone-conduction microphone. With any of the above-described configurations, the sound input device 5 minimizes the influence of a mask worn by the worker, the influence of surrounding noise (such as sound of flowing water involved with food handling, and sound made by the food work device in operation), and the influence of voice of a coworker. As a result, the accuracy with which sound is input increases.

The sound recognition device 6 recognizes the voice input from the sound input device 5 and causes the controller 3 to perform predetermined processing based on the sound that has been recognized. There is no particular limitation to the method of voice recognition, and it is possible to use any of various methods. Details of the processing that the controller 3 causes the sound recognition device 6 to perform will be described later.

The sound output device 7 is a device that outputs a sound synthesized by the sound recognition device 6. A non-limiting example of the sound output device 7 is a speaker. The sound output device 7 outputs a sound that indicates content associated with the processing that the controller 3 has performed. The sound output device 7 may be mounted on some other element such as the controller 3 and the sound recognition device 6, or may be carried by the worker. In the configuration in which the sound output device 7 is mounted on some other element, the sound output device 7 may be a directional speaker that selectively outputs sound to the worker located in a particular direction or a particular area (a direction or an area in which the worker is located on the food production line). In the configuration in which the sound output device 7 is carried by the worker, the sound output device 7 may be a head set, which is a microphone-earphone combination, and mounted on the inner surface of a hood of food workwear. It is also possible to use a bone-conduction earphone. With any of the above-described configurations, the sound output device 7 minimizes the influence of a hood of a food workwear, the influence of surrounding noise (such as sound of flowing water involved with food handling, and sound made by the food work device in operation), and the influence of voice of a coworker. As a result, the accuracy with which the worker hears sound increases.

It is to be noted that the above-described configuration of the food processing system 1 has been provided for example purposes only and is not intended in a limiting sense. Another possible configuration is that one, some, or all of the functions of the sound recognition device 6 is(are) incorporated in the controller 3, so that the sound recognition device 6 and the controller 3 are integral to each other. Another possible configuration is that the touch panel 4 is also connected to the sound recognition device 6 so that the touch panel 4 displays, without intervention by the controller 3, a result of processing by the sound recognition device 6. Another possible configuration is that one, some, or all of the functions of each motor control device 8 of the food work device 2 is(are) incorporated in the controller 3, or, conversely, one, some, or all of the functions of the controller 3 is(are) incorporated in each motor control device 8 of the food work device 2.

2. Functional Configuration of Sound Recognition Device

By referring to FIG. 2, an example functional configuration of the sound recognition device 6 will be described.

Figure 2:
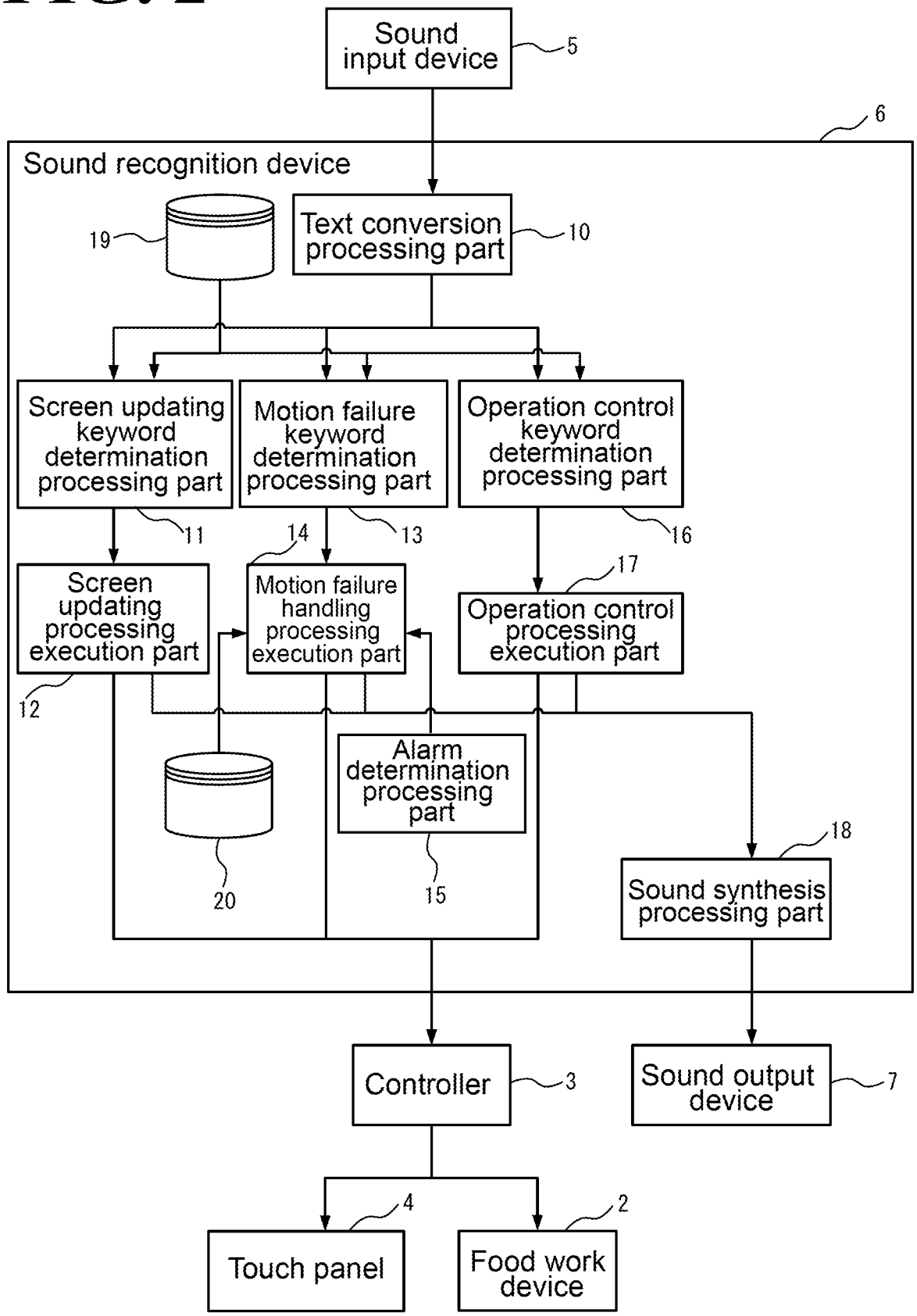
FIG. 2 is a block diagram illustrating an example functional configuration of a sound recognition device.

As illustrated in FIG. 2, the sound recognition device 6 includes a text conversion processing part 10, a screen updating keyword determination processing part 11, a screen updating processing execution part 12, a motion failure keyword determination processing part 13, a motion failure handling processing execution part 14, an alarm determination processing part 15, an operation control keyword determination processing part 16, an operation control processing execution part 17, a sound synthesis processing part 18, a keyword database 19, and a handling method database 20.

The text conversion processing part 10 converts the voice input from the sound input device 5 into a corresponding text (character string). Specifically, the text conversion processing part 10 subjects the voice to a frequency analysis to recognize phonemes of the voice using a sound recognition dictionary (such as acoustic models, language models, and a pronunciation dictionary) and convert the voice into a text. It is possible to use a machine learning technique and/or a deep learning technique in the processing performed by the text conversion processing part 10.

The screen updating keyword determination processing part 11 (which is a non-limiting example of the first keyword determination processing circuit recited in the appended claims) determines whether the text generated by the conversion at the text conversion processing part 10 includes a keyword associated with screen updating of the touch panel 4 (this keyword will be hereinafter referred to as "screen updating keyword"). The screen updating keyword (which is a non-limiting example of the first keyword recited in the appended claims) includes: keywords on which to directly select screens, such as "Main screen", "Monitor screen", "Automatic operation screen", and "Alarm screen"; and keywords on which to move the page forward and backward, such as "Next page (screen)" and "Previous page (screen)". These screen updating keywords are registered in advance in the keyword database 19 and open to change, addition, and/or deletion, as desired.

When the screen updating keyword determination processing part 11 has determined that the text includes a screen updating keyword, the screen updating processing execution part 12 (which is a non-limiting example of the first processing execution circuit recited in the appended claims) causes the controller 3 to perform screen updating processing of updating the operation screen on the touch panel 4 to an updating screen corresponding to the screen updating keyword (the updating screen is a non-limiting example of the first keyword screen recited in the appended claims).

Thus, the operation screen on the touch panel 4 is changed to the updating screen corresponding to the screen updating keyword.

The motion failure keyword determination processing part 13 (which is a non-limiting example of the second keyword determination processing circuit recited in the appended claims) determines whether the text generated by the conversion at the text conversion processing part 10 includes a keyword associated with a motion failure of the food work device 2 (this keyword will be hereinafter referred to as "motion failure keyword"). The motion failure keyword (which is a non-limiting example of the second keyword recited in the appended claims) includes such keywords as "Not moving", "Unable to make a motion", "Stopped moving", "Broken", and "Malfunctioning". These motion failure keywords are registered in advance in the keyword database 19 and open to change, addition, and/or deletion, as desired.

When the motion failure keyword determination processing part 13 has determined that the text includes a motion failure keyword, the motion failure handling processing execution part 14 (which is a non-limiting example of the second processing execution circuit recited in the appended claims) causes the controller 3 to perform motion failure handling processing of displaying, on the touch panel 4, a method of handling the motion failure corresponding to the motion failure keyword. Thus, the method of handling the motion failure is displayed on the touch panel 4.

The alarm determination processing part 15 determines whether the controller 3 is raising an alarm (for example, whether an alarm screen is displayed on the touch panel 4). When the alarm determination processing part 15 has determined that the controller 3 is raising an alarm, the motion failure handling processing execution part 14 reads alarm information (for example, an alarm code) from the controller 3. Then, based on the alarm information, the motion failure handling processing execution part 14 obtains the method of handling from the handling method database 20. When the alarm determination processing part 15 has determined that the controller 3 is not raising an alarm, the motion failure handling processing execution part 14 requests additional information (such as details of the motion failure) from the worker. Then, based on the additional information, the motion failure handling processing execution part 14 obtains the method of handling from the handling method database 20. The handling method database 20 stores alarm information in correlation with the cause of the alarm and a method of handling the alarm. The handling method database 20 also stores details of the motion failure in correlation with the cause of the motion failure and a method of handling the motion failure.

The operation control keyword determination processing part 16 (which is a non-limiting example of the third keyword determination processing circuit recited in the appended claims) determines whether the text generated by the conversion at the text conversion processing part 10 includes a keyword associated with operation control of the food work device 2 (this keyword will be hereinafter referred to as "operation control keyword"). The operation control keyword (which is a non-limiting example of the third keyword recited in the appended claims) includes such keywords as "Servo on", "Servo off", "Start operation", and "End operation". These operation control keywords are registered in advance in the keyword database 19 and open to change, addition, and/or deletion, as desired.

When the operation control keyword determination processing part 16 has determined that the text includes an operation control keyword, the operation control processing execution part 17 (which is a non-limiting example of the third processing execution circuit recited in the appended claims) causes the controller 3 to perform operation control processing corresponding to the operation control keyword. In this manner, a servo-on operation and a servo-off operation of each of the motors 9 of the food work device 2 are performed, and an automatic operation of the food work device 2 is started and stopped.

The sound synthesis processing part 18 synthesizes a sound that indicates content associated with the processing that the controller 3 has performed under the control of the screen updating processing execution part 12, under the control of the motion failure handling processing execution part 14, and under the control of the operation control processing execution part 17. The synthesized sound is output from the sound output device 7. In the case of the screen updating processing, which is controlled by the screen updating processing execution part 12, the output sound says, for example: "Screen 'A' is to be displayed"; "Next page is to be displayed"; and "Previous page is to be displayed". In the case of the motion failure handling processing, which is controlled by the motion failure handling processing execution part 14, the output sound indicates content of the method of handling, saying, for example: "Check 'A'NSERT-2Q; "Operate 'A'"; and "Replace 'A'". In the case of the operation control processing, which is controlled by the operation control processing execution part 17, the output sound says, for example: "Servo on"; and "Automatic operation starts".

It is to be noted that the above-described correspondence between each processing and a processing part or execution part is not intended in a limiting sense, that is, the above-described processings may be performed by a smaller number of processing parts or execution parts (for example, a single processing part or execution part), or by a larger number of processing parts or execution parts. It is also to be noted that the function of each processing part or execution part may be implemented by a program executed by CPU 901 (described later by referring to FIG. 10), or may be partially or entirely implemented by a tangible device or devices such as an application specific integrated circuit (ASIC), a field-programmable gate array (FPGA), and other electric circuits.

Also, the above-described functional configuration of the sound recognition device 6 has been provided for example purposes only and is not intended in a limiting sense. Another possible configuration is that the sound recognition device 6 includes a noise removal processing part (such as a noise canceling and a noise filter) to minimize the influence of surrounding noise (such as sound of flowing water and machine sound) and the influence of voice of a coworker, thereby increasing the accuracy with which sound is input.

3. Procedure for Processing Performed by Sound Recognition Device

By referring to FIGS. 3 to 5, an example procedure for processing performed by the sound recognition device 6 will be described.

Figure 3:
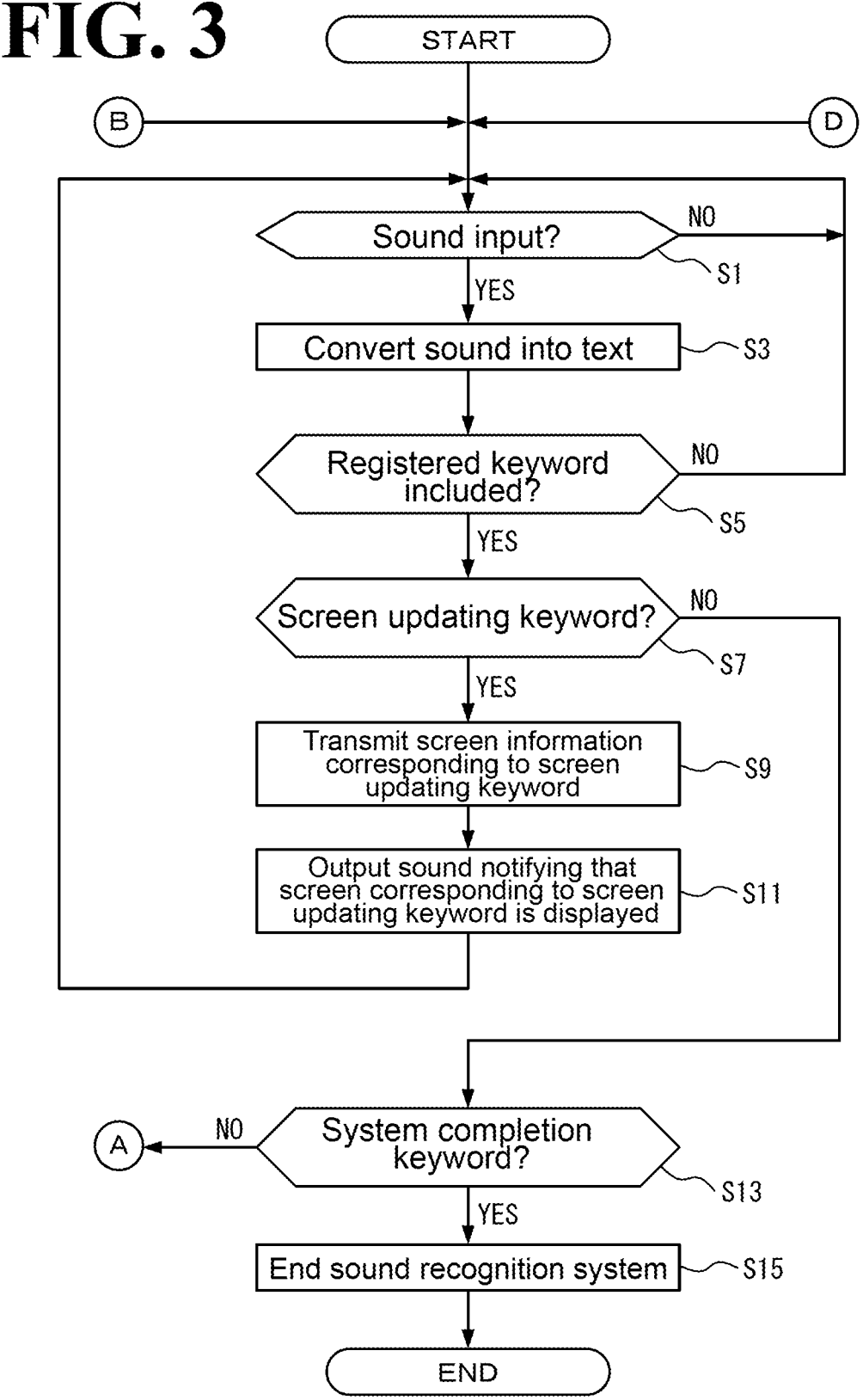
FIG. 3 is a flowchart of an example procedure for processing performed by the sound recognition device.

As illustrated in FIG. 3, at step S1, the sound recognition device 6 determines whether a voice has been input from the sound input device 5. This step is repeated until a voice is input (NO at step S1). When a voice has been input (YES at step S1), the procedure moves to next step S3.

At step S3, the sound recognition device 6 causes the text conversion processing part 10 to convert the voice input from the sound input device 5 into a corresponding text.

At step S5, the sound recognition device 6 determines whether the text generated by the conversion at step S3 includes a keyword registered in the keyword database 19. When the generated text does not include a registered keyword (NO at step S5), the procedure returns to step S1. When the generated text includes a registered keyword (YES at step S5), the procedure proceeds to step S7.

At step S7, the sound recognition device 6 causes the screen updating keyword determination processing part 11 to determine whether the text generated by the conversion at step S3 includes a screen updating keyword associated with screen updating of the touch panel 4. When the generated text includes a screen updating keyword (YES at step S7), the procedure proceeds to step S9.

At step S9, the sound recognition device 6 causes the screen updating processing execution part 12 to transmit, to the controller 3, updating screen information (for example, page number) corresponding to the screen updating keyword determined as being included in the generated text at step S7. In this manner, the sound recognition device 6 causes the controller 3 to perform screen updating processing of displaying on the touch panel 4 the updating screen indicated by the screen information.

At step S11, the sound recognition device 6 causes the sound synthesis processing part 18 to synthesize a sound notifying that the updating screen corresponding to the screen updating keyword determined as being included in the generated text at step S7 is to be displayed. Then, the sound recognition device 6 causes the sound output device 7 to output the synthesized sound. Then, the procedure returns to former step S1.

When at step S7 the generated text does not include a screen updating keyword (NO at step S7), the procedure proceeds to step S13.

At step S13, the sound recognition device 6 determines whether the text generated by the conversion at step S3 includes a keyword associated with ending of the sound recognition system (this keyword will be hereinafter referred to as "system ending keyword"). The system ending keyword includes such keywords as "Shutdown", "End of system", and "Good bye". These system ending keywords are registered in advance in the keyword database 19 and open to change, addition, and/or deletion, as desired. When the generated text includes a system ending keyword (YES at step S13), the procedure proceeds to step S15.

At step S15, the sound recognition device 6 ends the sound recognition system. Thus, the flow of this procedure ends.

Figure 4:
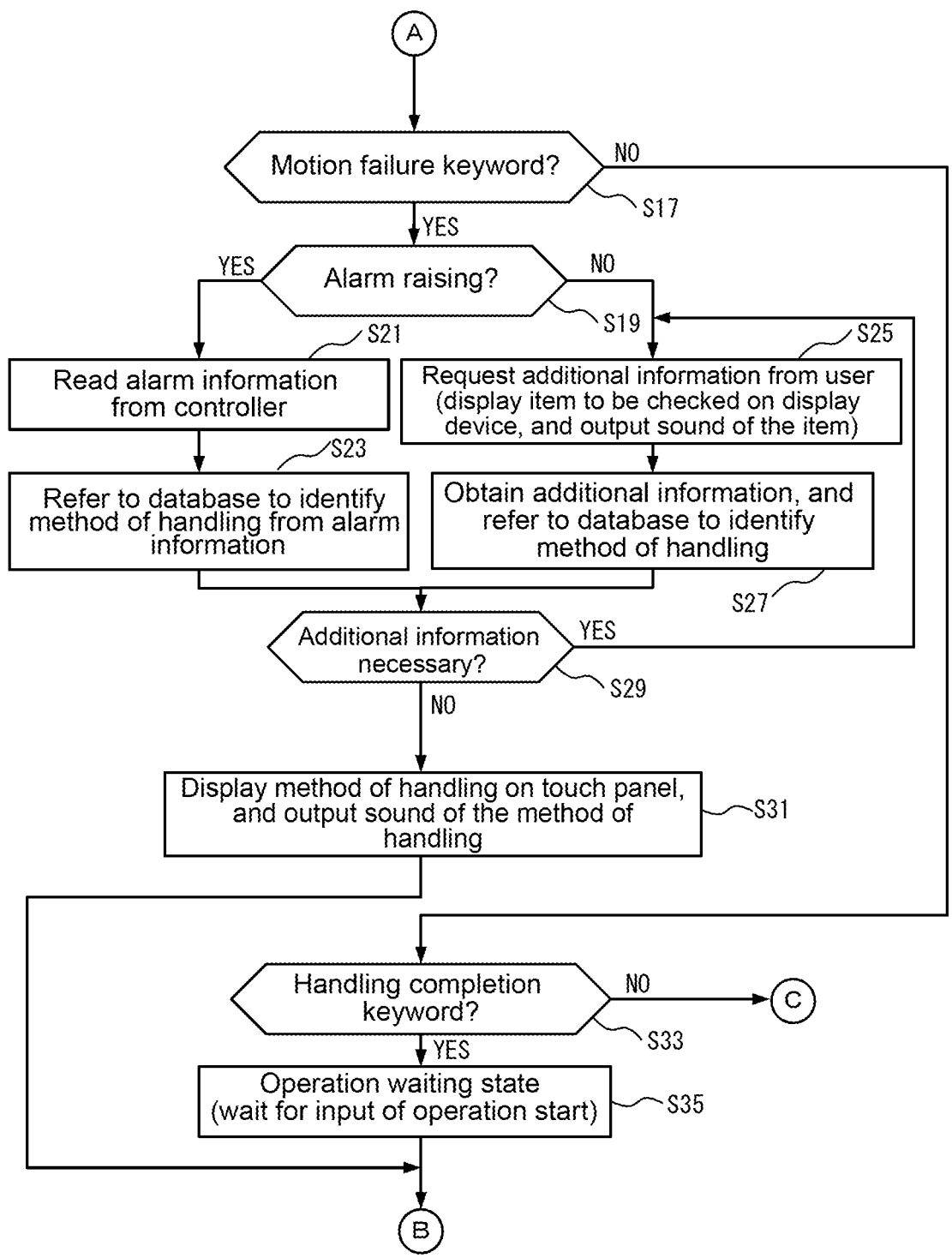
FIG. 4 is a flowchart of an example procedure for processing performed by the sound recognition device.

When at step S13 the generated text does not include a system ending keyword (NO at step S13), the procedure proceeds to step S17 illustrated in FIG. 4.

As illustrated in FIG. 4, at step S17, the sound recognition device 6 causes the motion failure keyword determination processing part 13 to determine whether the text generated by the conversion at step S3 includes a motion failure keyword associated with a motion failure of the food work device 2. When the generated text includes the motion failure keyword (YES at step S17), the procedure proceeds to step S19.

At step S19, the sound recognition device 6 causes the alarm determination processing part 15 to determine whether the controller 3 is raising an alarm. When the controller 3 is raising an alarm (YES at step S19), the procedure proceeds to step S21.

At step S21, the sound recognition device 6 causes the motion failure handling processing execution part 14 to read alarm information from the controller 3.

At step S23, the sound recognition device 6 causes the motion failure handling processing execution part 14 to refer to the handling method database 20 so as to, based on the alarm information read at step S21, identify a method of handling the motion failure. Then, the procedure proceeds to step S29, described later.

When at step S19 the controller 3 is not raising an alarm (NO at step S19), the procedure proceeds to step S25.

At step S25, the sound recognition device 6 causes the motion failure handling processing execution part 14 to request additional information (such as details of the motion failure) from the worker. Specifically, the sound recognition device 6 causes the touch panel 4 to display an item to be checked and causes the sound output device 7 to output the item.

At step S27, the sound recognition device 6 causes the text conversion processing part 10 to obtain the additional information by receiving a sound given by the worker as an answer and converting the sound into a text. Then, the sound recognition device 6 causes the motion failure handling processing execution part 14 to refer to the handling method database 20 and identify, based on the obtained additional information, a method of handling the motion failure.

At step S29, the sound recognition device 6 determines whether additional information is necessary, in other words, whether the processing performed by the motion failure handling processing execution part 14 has narrowed possible methods of handling down to a single method of handling. When additional information is necessary (YES at step S29), the procedure returns to step S25 so that steps 25 and 27 are performed again. When additional information is not necessary (NO at step S29), the procedure proceeds to step S31.

At step S31, the sound recognition device 6 causes the motion failure handling processing execution part 14 to transmit to the controller 3 the method of handling identified at step S23 or step S27, and causes the touch panel 4 to display the identified method of handling. Also, the sound recognition device 6 causes the sound synthesis processing part 18 to synthesize a sound indicating content of the identified method of handling, and causes the sound output device 7 to output the synthesized sound. Then, the procedure returns to former step S1.

When at step S17 the text generated by the conversion at step S3 does not include the motion failure keyword (NO at step S17), the procedure proceeds to step S33.

At step S33, the sound recognition device 6 determines whether the text generated by the conversion at step S3 includes a keyword indicating that the handling based on the method of handling output at step S31 is completed (this keyword will be hereinafter referred to as "handling completion keyword"). The handling completion keyword includes such keywords as "Completed", "Solved", "Moving", and "Fixed". These handling completion keywords are registered in advance in the keyword database 19 and open to change, addition, and/or deletion, as desired. When the generated text includes the handling completion keyword (YES at step S33), the procedure proceeds to step S35.

At step S35, the sound recognition device 6 transmits a command to the controller 3 so as to bring the food work device 2 into operation waiting state. A non-limiting example of the operation waiting state is that the food work device 2 is waiting for an operation starting instruction to be input, in the form of, for example, voice of the worker or manipulation of the touch panel 4. Then, the procedure returns to former step S1.

Figure 5:
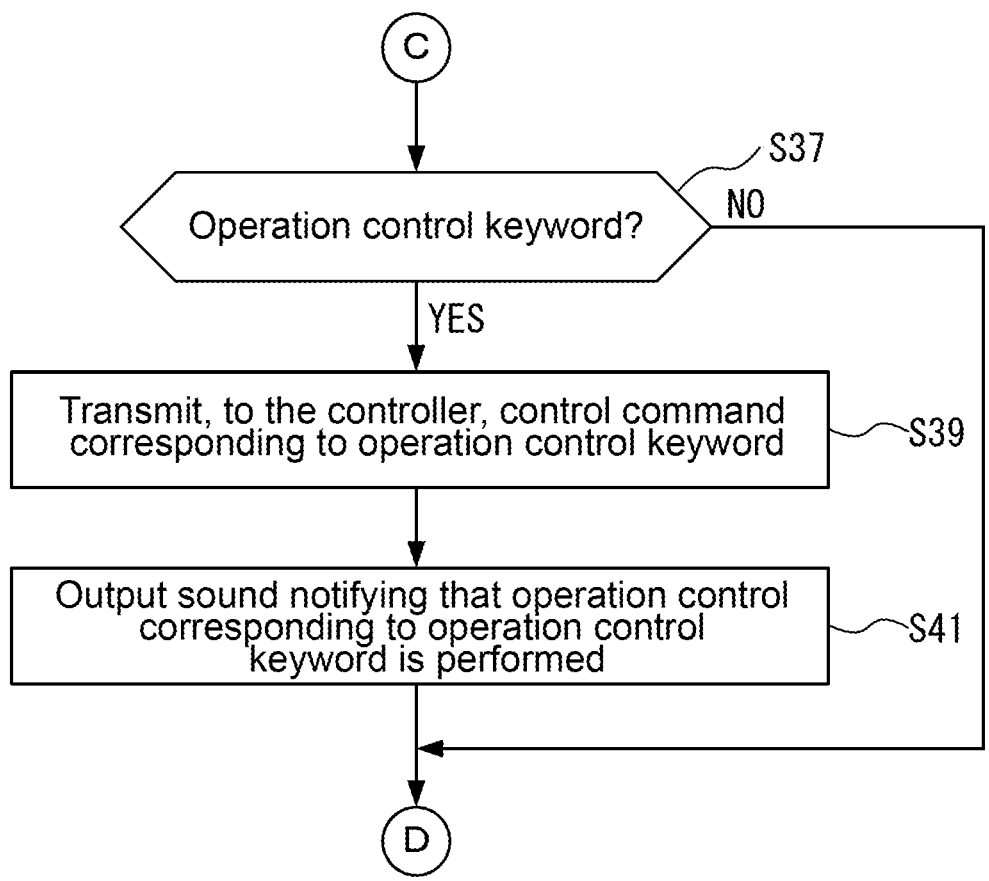
FIG. 5 is a flowchart of an example procedure for processing performed by the sound recognition device.

When at step S33 the text generated by the conversion at step S3 does not include the handling completion keyword (NO at step S33), the procedure proceeds to step S37 illustrated in FIG. 5.

As illustrated in FIG. 5, at step S37, the sound recognition device 6 causes the operation control keyword determination processing part 16 to determine whether the text generated by the conversion at step S3 includes an operation control keyword associated with operation control of the food work device 2. When the generated text does not include the operation control keyword (NO at step S37), the procedure returns to former step S1. When the generated text includes the operation control keyword (YES at step S37), the procedure proceeds to step S39.

At step S39, the sound recognition device 6 causes the operation control processing execution part 17 to transmit to the controller 3 a control command corresponding to the operation control keyword so as to cause the controller 3 to perform operation control processing corresponding to the operation control keyword. It is to be noted that during the operation control processing, the controller 3 displays on the touch panel 4 an indication notifying that the operation control processing is underway.

At step S41, the sound recognition device 6 causes the sound synthesis processing part 18 to synthesize a sound notifying that operation control corresponding to the operation control keyword is to be performed, and causes the sound output device 7 to output the synthesized sound. Then, the procedure returns to former step S1.

4. Advantageous Effects of the Embodiment

As has been described hereinbefore, the food processing system 1 according to this embodiment includes the food work device 2, the controller 3, the sound input device 5, and the sound recognition device 6. The food work device 2 performs predetermined work on a food. The controller 3 controls the food work device 2. Into the sound input device 5, voice of the worker is input. The sound recognition device 6 recognizes the sound that has been input, and causes the controller 3 to perform predetermined processing based on the sound that has been recognized. This configuration provides advantageous effects, some of which are described below.

Food work devices used on food production lines are generally manipulated using manipulation terminals such as touch panels and teaching pendants. In this regard, there may be such food production lines that the worker touches both the manipulation terminal and food by hand. These food production lines produce food in less sanitary conditions in that the worker may touch food immediately after touching the manipulation terminal and that food may attach to the manipulation terminal (manipulation terminals are difficult to wash).

The food processing system 1 according to this embodiment enables workers to use sound (such as voice) to cause the controller 3 to perform predetermined processing. This enables workers to perform operations such as manipulating the food work device 2 without detaching the worker's hand from the food and then touching the manipulation terminal, such as the touch panel 4. As a result, food is produced in well-maintained sanitary conditions.

Also on food production lines, there may be people who work on the side or part-time and are unaccustomed to machine manipulation. It may be difficult for these workers to determine how to manipulate the manipulation terminal, such as the touch panel 4, when the workers want the food work device 2 to make a desired motion or want to obtain desired information. Thus, there has been a need for improvement in terminal manipulability. In this embodiment, the worker is able to use sound (such as voice) to cause the controller 3 to perform predetermined processing, enabling the worker to manipulate the touch panel 4 appropriately and/or obtain suitable information, even if the worker is unaccustomed to manipulating the touch panel 4.

Also in this embodiment, the food processing system 1 further includes the touch panel 4. The touch panel 4 displays an operation screen associated with operation control of the food work device 2 controlled by the controller 3. The sound recognition device 6 includes the screen updating keyword determination processing part 11 and the screen updating processing execution part 12. The screen updating keyword determination processing part 11 determines whether the sound that has been recognized includes a screen updating keyword associated with screen updating of the touch panel 4. When the sound that has been recognized includes the screen updating keyword, the screen updating processing execution part 12 causes the controller 3 to perform screen updating processing of updating the operation screen on the touch panel 4 to an updating screen corresponding to the screen updating keyword.

This enables the worker to use sound (such as voice) to change the operation screen on the touch panel 4 to a desired screen without detaching the worker's hand from the food and then touching the manipulation terminal, such as the touch panel 4. As a result, food is produced in well-maintained sanitary conditions. Also, screens on some manipulation terminals have a layer structure, and there may be a case where a worker has to skip an irrelevant screen(s) before reaching a desired screen (that is, it may be necessary to skip through a plurality of screens). In light of the circumstances, the above-described embodiment provides improved terminal manipulability in that the worker is able to directly reach a desired screen.

Also in this embodiment, the sound recognition device 6 includes the motion failure keyword determination processing part 13 and the motion failure handling processing execution part 14. The motion failure keyword determination processing part 13 determines whether the sound that has been recognized includes a motion failure keyword associated with a motion failure of the food work device 2. When the sound that has been recognized includes the motion failure keyword, the motion failure handling processing execution part 14 causes the controller 3 to perform motion failure handling processing of displaying, on the touch panel 4, a method of handling the motion failure.

This ensures that the worker need not detach the worker's hand from the food and then touch the manipulation terminal, such as the touch panel 4; instead, the worker is able to use sound (such as voice) to input a notification of a motion failure occurrence, thereby causing the method of handling to be displayed. This, in turn, enables the worker to handle the motion failure more approximately. Also, it is not necessary for the worker to look for a switch or a button when the worker wants the method of handling to be displayed. This enables the worker to manipulate the touch panel 4 appropriately and/or obtain suitable information to handle the motion failure, even if the worker is unaccustomed to manipulating the touch panel 4.

Also in this embodiment, the sound recognition device 6 includes the alarm determination processing part 15. The alarm determination processing part 15 determines whether the controller 3 is raising an alarm. When the controller 3 is raising an alarm, the motion failure handling processing execution part 14 obtains, based on alarm information from the controller 3, a method of handling the motion failure. When the controller 3 is not raising an alarm, the motion failure handling processing execution part 14 requests additional information from the worker and obtains, based on the additional information, the method of handling the motion failure.

In addition to the alarm determination processing part 15, the sound recognition device 6 includes the handling method database 20. The handling method database 20 stores alarm information in correlation with methods of handling motion failures. This ensures that when the controller 3 is raising an alarm, a suitable method of handling a motion failure is provided based on the alarm information obtained from the controller 3. The handling method database 20 of the sound recognition device 6 may also store motion failures in correlation with methods of handling the motion failures. This ensures that when the controller 3 is not raising an alarm, details of a motion failure are obtained by a request to the worker, and a suitable method of handling the motion failure is provided based on the obtained details of the motion failure.

Also in this embodiment, the sound recognition device 6 includes the operation control keyword determination processing part 16 and the operation control processing execution part 17. The operation control keyword determination processing part 16 determines whether the sound that has been recognized includes an operation control keyword associated with operation control of the food work device 2. When the sound that has been recognized includes the operation control keyword, the operation control processing execution part 17 causes the controller 3 to perform operation control processing corresponding to the operation control keyword.

This enables the worker to use sound (such as voice) to perform preparation, starting, ending, and other processing associated with the operation of the food work device 2 without detaching the worker's hand from the food and then touching the manipulation terminal, such as the touch panel 4. As a result, food is produced in well-maintained sanitary conditions. Also, it is not necessary for the worker to look for a switch or a button when the worker wants to operate the food work device 2, enabling the worker to more readily operate the food work device 2, even if the worker is unaccustomed to manipulating the manipulation terminal, such as the touch panel 4.

Also in this embodiment, the sound recognition device 6 includes the sound synthesis processing part 18. The sound synthesis processing part 18 synthesizes a sound that indicates content associated with the processing that the controller 3 has performed. The food processing system 1 further includes the sound output device 7. The sound output device 7 outputs the sound synthesized by the sound synthesis processing part 18.

This provides improved user-friendliness in that the worker is able to check, in the form of sound, content of the processing that the controller 3 has performed. Also, the configuration in which the method of handling the motion failure is output in the form of sound provides the worker with improved workability in that even when the worker is positioned at a distance from the controller 3, the worker is able to obtain the method of handling the motion failure by hearing the output sound and perform work based on the obtained method of handling the motion failure.

5. Modifications

Modifications of the above-described embodiment will be described below.

5-1. Identifying Object by Detecting Sight Direction

By referring to FIG. 6, an example general arrangement of a food processing system 1A according to this modification will be described. It is to be noted that like reference numerals designate corresponding or identical elements in the FIGS. 1 and 6, and these elements will not be elaborated upon here.

Figure 6:
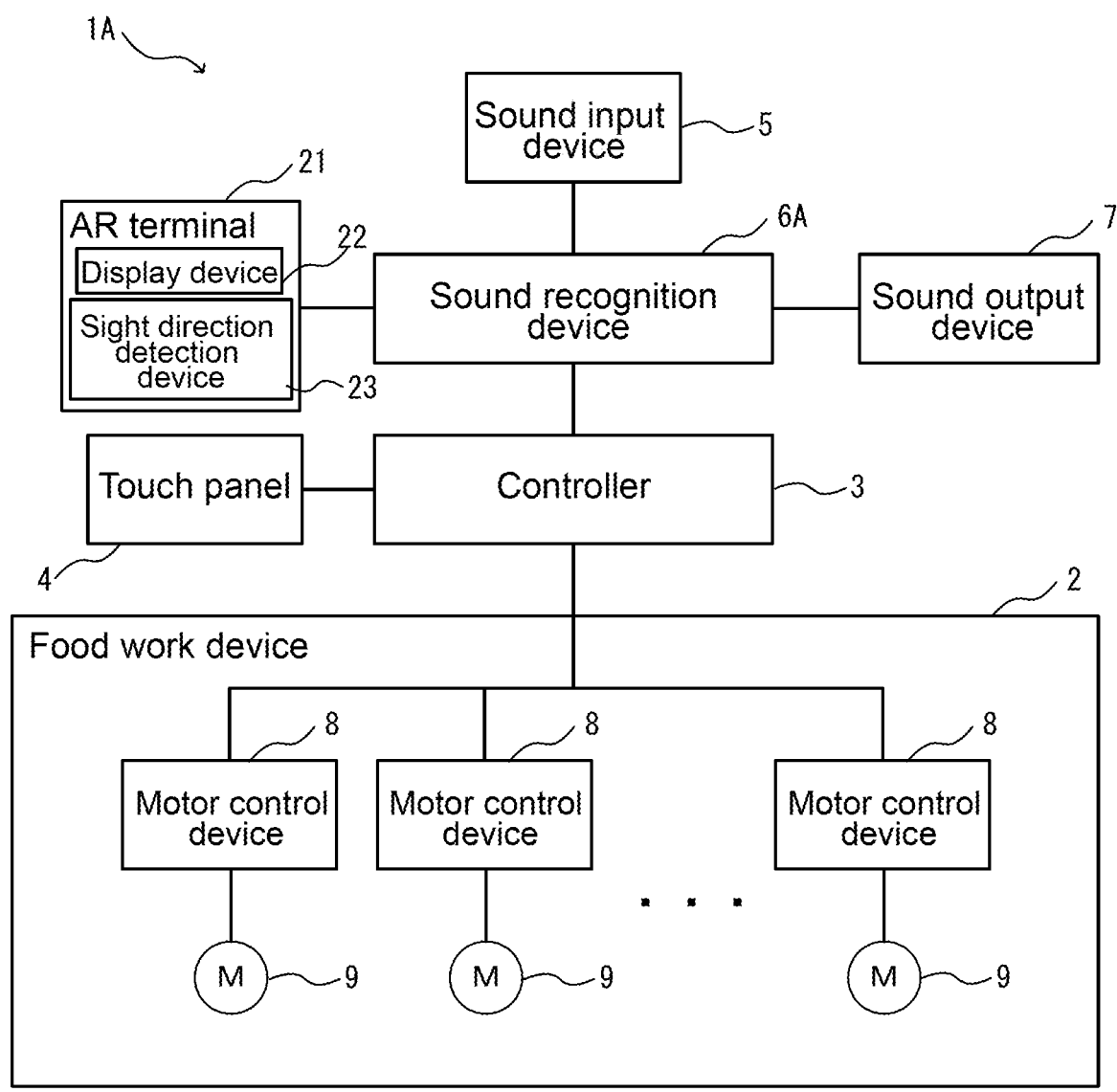
FIG. 6 illustrates an example general arrangement of a food processing system according to a modification in which a target is identified by detecting a sight direction.

As illustrated in FIG. 6, the food processing system 1A includes an AR (Augmented Reality) terminal 21, in addition to the configuration of the food processing system 1 according to the above-described embodiment. The AR terminal 21 is a transmission-type head mount display attachable to the head or face of the worker. The AR terminal 21 includes a display device 22 and a sight direction detection device 23.

Examples of the display device 22 include, but are not limited to, a liquid crystal display and an organic electroluminescent (EL) display. The display device 22 superimposes an image generated by the sound recognition device 6 over a real view around the worker.

The sight direction detection device 23 (which is a non-limiting example of the sight direction detection device recited in the appended claims) detects the direction of sight of the worker, and transmits to the sound recognition device 6 sight direction information indicating the detected sight direction. There is no particular limitation to the method of detecting the sight direction, and it is possible to use any of various methods. For example, it is possible to: take an image of an eye of a user using a visible light camera; on the image, regard a corner of the eye as a reference point and regard the iris of the eye as a moving point; and calculate sight direction information based on the position of the iris relative to the corner of the eye. For further example, it is possible to: using an infrared camera, take an image of an eye of a user irradiated with infrared light from an infrared LED; regard, as a reference point, the position of reflection light (corneal reflex caused by the infrared light) on the cornea of the eye, and regard the pupil of the eye as a moving point; and calculate sight direction information based on the position of the pupil relative to the position of the corneal reflex. For further example, it is possible to detect a change in surface electromyography (EMG) potential of the face of the worker or a change in ocular potential, which occurs in small amounts when the eyeball moves.

The food processing system 1A is otherwise similar in configuration to the food processing system 1 according to the above-described embodiment, and will not be elaborated upon further here.

By referring to FIG. 7, an example functional configuration of the sound recognition device 6A according to this modification will be described. It is to be noted that like reference numerals designate corresponding or identical elements in the FIGS. 7 and 2, and these elements will not be elaborated upon here.

Figure 7:
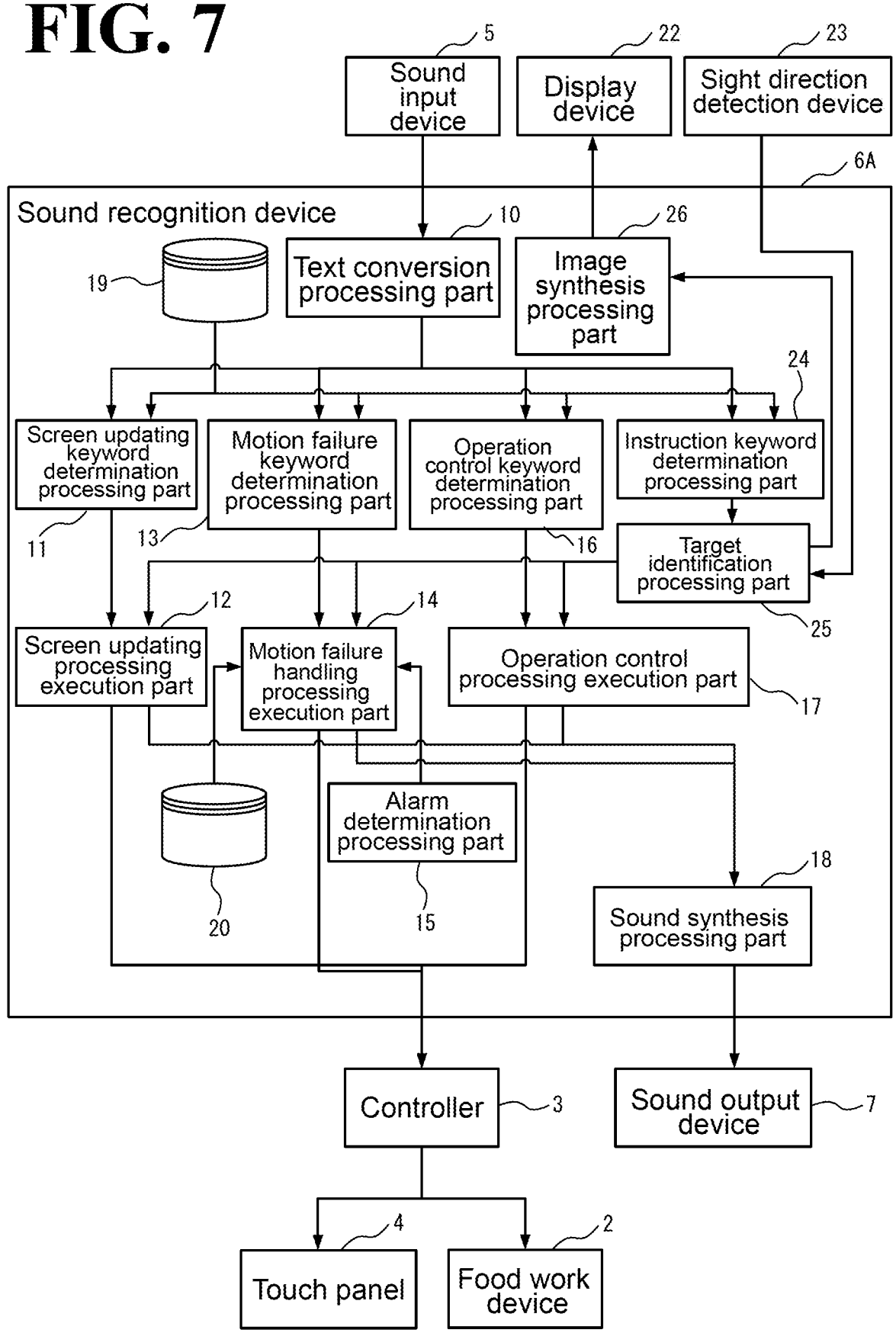
FIG. 7 is a block diagram illustrating an example functional configuration of a sound recognition device according to the modification in which a target is identified by detecting a sight direction.

As illustrated in FIG. 7, the sound recognition device 6A includes an instruction keyword determination processing part 24, a target identification processing part 25, and an image synthesis processing part 26, in addition to the configuration of the sound recognition device 6 according to the above-described embodiment.

The instruction keyword determination processing part 24 (which is a non-limiting example of the fourth keyword determination processing circuit recited in the appended claims) determines whether the text generated by the conversion at the text conversion processing part 10 includes a keyword associated with a vague instruction term (this keyword will be hereinafter referred to as "instruction keyword"). The instruction keyword (which is a non-limiting example of the fourth keyword recited in the appended claims) includes such keywords as "that", "this", and "it". These instruction keywords are registered in advance in the keyword database 19 and open to change, addition, and/or deletion, as desired.

When the instruction keyword determination processing part 24 has determined that the generated text includes an instruction keyword, the target identification processing part 25 identifies a processing target based on sight direction information from the sight direction detection device 23 of the AR terminal 21. Specifically, the target identification processing part 25 identifies, as the processing target, an entirety or a part of an article toward which the sight of the worker is directed on the display device 22.

The image synthesis processing part 26 generates an identification image that makes the identified processing target distinguishable from other objects. Then, the image synthesis processing part 26 transmits the identification image to the display device 22 of the AR terminal 21. Specifically, the identification image is that the identified processing target is displayed in color or surrounded by a line.

As necessary, the result of the identification processing performed by the target identification processing part 25 may be used in the screen updating processing performed by the screen updating processing execution part 12, the motion failure handling processing performed by the motion failure handling processing execution part 14, and/or the operation control processing performed by the operation control processing execution part 17. For example, when the worker wants to check the condition of a particular motor 9, the worker may look at the particular motor 9 and say: "Monitor screen of that". This causes the screen updating processing execution part 12 to update the operation screen on the touch panel 4 to a monitor screen including the condition of the particular motor 9. For further example, when a motion failure has been found at a particular portion of the food work device 2, the worker may look at the particular portion and say: "This is not moving". This causes the motion failure handling processing execution part 14 to obtain from the handling method database 20 a method of handling the motion failure of the particular portion; causes the touch panel 4 to display the method of handling the motion failure; and causes the sound output device 7 to output the method of handling the motion failure in the form of sound. For further example, when the worker wants to turn a particular motor 9 into servo-on state, the worker may look at the particular motor 9 and say: "Make it servo-on". This causes the operation control processing execution part 17 to perform servo-on processing on the particular motor 9.

The sound recognition device 6A is otherwise similar in configuration to the sound recognition device 6 according to the above-described embodiment, and will not be elaborated upon further here.

By referring to FIG. 8, an example procedure for target identification processing performed by the sound recognition device 6A according to this modification will be described. The sound recognition device 6A performs the target identification processing illustrated in FIG. 8 simultaneously with the processing illustrated in FIGS. 3 to 5.

Figure 8:
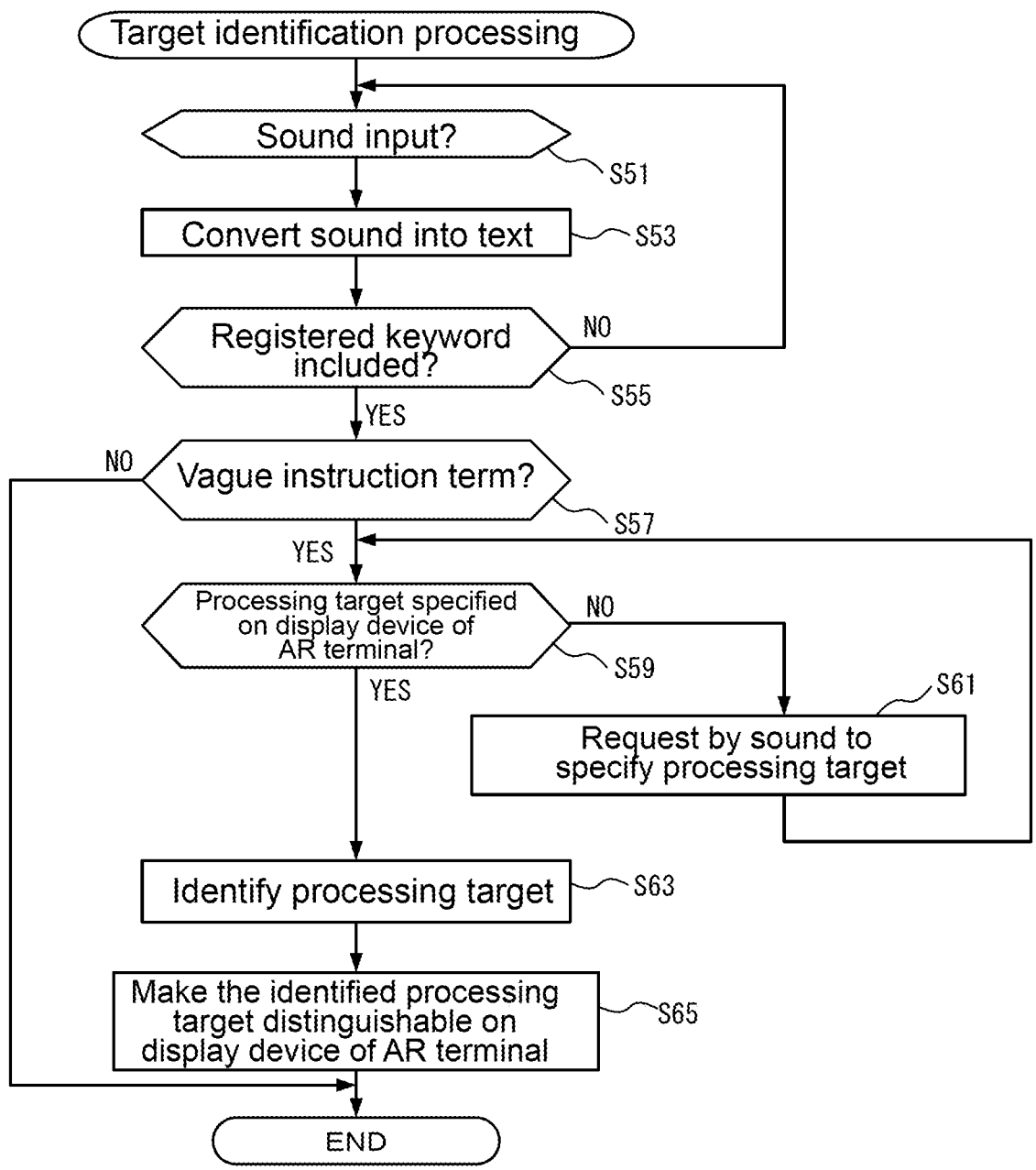
FIG. 8 is a flowchart of an example procedure for target identification processing performed by the sound recognition device.

Steps S51 to S55 illustrated in FIG. 8 are similar to steps S1 to S5 illustrated in FIG. 3 and will not be elaborated upon here.

At step S57, the sound recognition device 6A determines whether the text generated at step S53 by the instruction keyword determination processing part 24 includes an instruction keyword associated with a vague instruction term. When the generated text does not include the instruction keyword (NO at step S57), the flow of this procedure ends. When the generated text includes the instruction keyword (YES at step S57), the procedure proceeds to step S59.

At step S59, the sound recognition device 6A determines whether a processing target has been specified on the display device 22 of the AR terminal 21. Specifically, in order to determine whether a processing target has been specified, the sound recognition device 6A determines whether the sight of the worker is continuously directed toward an entirety or a part of a particular article for equal to or longer than a predetermined period of time. When no processing target has been specified (NO at step S59), the procedure proceeds to step S61.

At step S61, the sound recognition device 6A causes the sound synthesis processing part 18 to synthesize a sound to request that the worker specify a processing target using the direction of the sight of the worker. Then, the sound recognition device 6A causes the sound output device 7 to output the synthesized sound. It is to be noted that in addition to or instead of sound, it is possible to display on the display device 22 an indication that requests for specification of a processing target. Then, the procedure returns to step S59.

When at step S59 a processing target has been specified (YES at step S59), the procedure proceeds to step S63.

At step S63, the sound recognition device 6A causes the target identification processing part 25 to, based on sight direction information from the sight direction detection device 23, identify the processing target that has been specified based on the sight direction.

At step S65, the sound recognition device 6A causes the image synthesis processing part 26 to: generate an identification image that makes the identified processing target distinguishable from other objects; and transmit the identification image to the display device 22 of the AR terminal 21. This ensures that the processing target is identifiable on the display device 22. Thus, the flow of this procedure ends.

It is to be noted that information of the processing target identified at step S63 is used in the screen updating processing performed by the screen updating processing execution part 12 (steps S9 to S11 illustrated in FIG. 3), the motion failure handling processing performed by the motion failure handling processing execution part 14 (steps S19 to S31 illustrated in FIG. 4), and the operation control processing performed by the operation control processing execution part 17 (steps S39 to S41 illustrated in FIG. 5).

With the modification described hereinbefore, the worker may use a vague instruction term such as "that" or "it" for an object that the worker is looking at, and the sound recognition device 6A makes a guess to identify the object intended by the worker. This ensures that the input from the worker is processed as an approximate input.

5-2. Motion Failure Handling Processing Performed Upon Raising of Alarm

In the above-described embodiment, the motion failure handling processing is performed upon input of a motion failure keyword in the form of sound from the worker. The motion failure handling processing may be performed upon raising of an alarm, irrespective of whether the worker has input a sound.

By referring to FIG. 9, an example procedure for processing performed by the sound recognition device 6B according to this modification (not illustrated) will be described.

Figure 9:
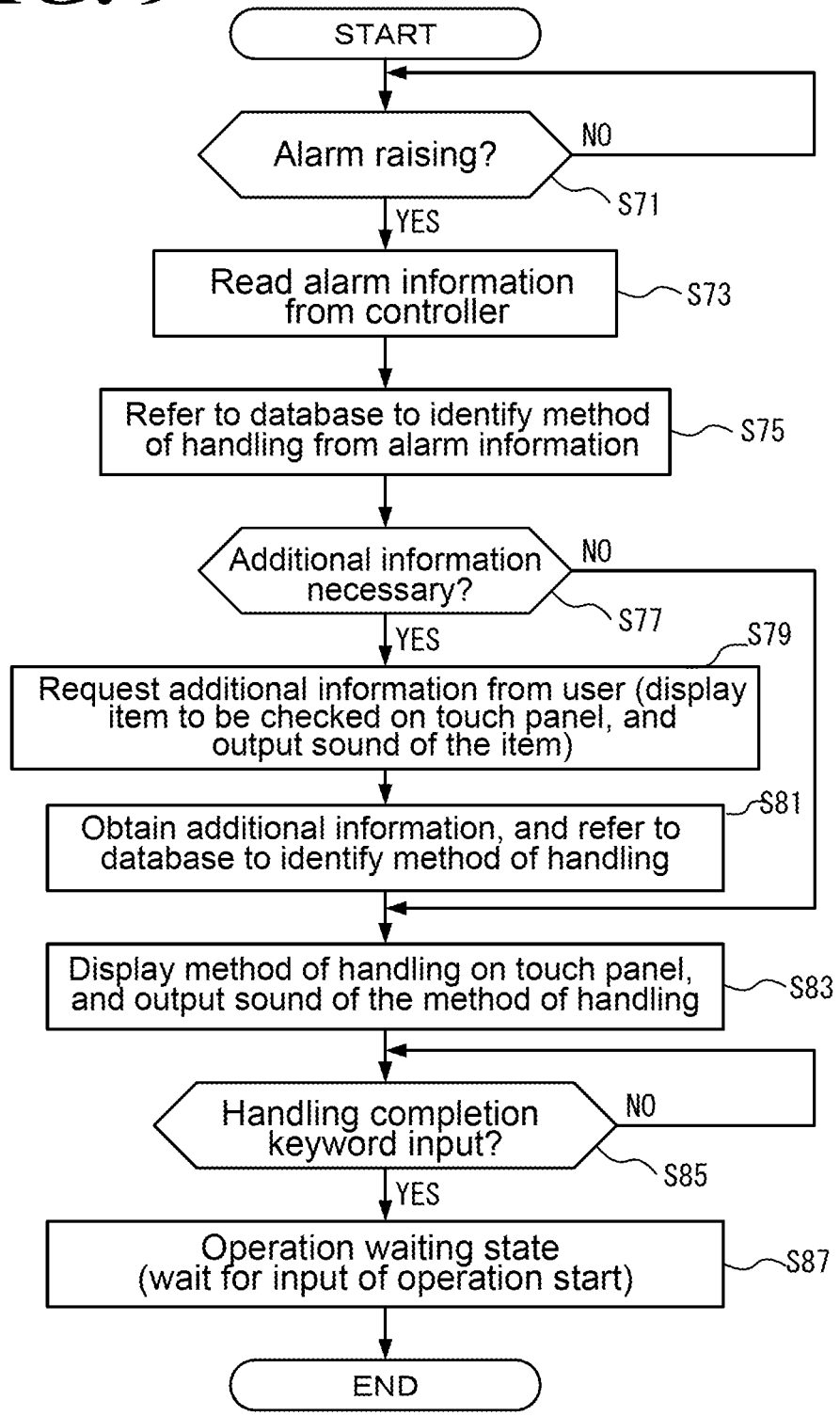
FIG. 9 is a flowchart of an example procedure for processing performed by a sound recognition device according to a modification in which motion failure handling processing is performed upon raising of an alarm.

As illustrated in FIG. 9, at step S71, the sound recognition device 6B causes the alarm determination processing part 15 to determine whether the controller 3 is raising an alarm. This step is repeated until the controller 3 raises an alarm (NO at step S71). When the controller 3 is raising an alarm (YES at step S71), the procedure proceeds to step S73.

At step S73, the sound recognition device 6B causes the motion failure handling processing execution part 14 to read alarm information from the controller 3.

At step S75, the sound recognition device 6B causes the motion failure handling processing execution part 14 to refer to the handling method database 20 so as to identify, based on the alarm information read at step S73, a method of handling the motion failure.

At step S77, the sound recognition device 6B determines whether additional information is necessary. When additional information is not necessary (NO at step S77), the procedure proceeds to step S83, described later. When additional information is necessary (YES at step S77), the procedure proceeds to step S79.

At step S79, the sound recognition device 6B causes the motion failure handling processing execution part 14 to request additional information (such as details of the motion failure) from the worker. Specifically, the sound recognition device 6B causes the touch panel 4 to display an item to be checked, and causes the sound output device 7 to output the item to be checked in the form of sound.

At step S81, the sound recognition device 6B causes the text conversion processing part 10 to obtain the additional information by receiving a sound given by the worker as an answer and converting the sound into a text. Then, the sound recognition device 6B causes the motion failure handling processing execution part 14 to refer to the handling method database 20 and identify, based on the obtained additional information, a method of handling the motion failure.

At step S83, the sound recognition device 6B causes the motion failure handling processing execution part 14 to transmit to the controller 3 the method of handling identified at step S75 or step S81, and causes the touch panel 4 to display the identified method of handling. Also, the sound recognition device 6B causes the sound synthesis processing part 18 to synthesize a sound indicating content of the identified method of handling, and causes the sound output device 7 to output the synthesized sound.

At step S85, the sound recognition device 6B determines whether a sound including a handling completion keyword has been input from the sound input device 5. This step is repeated until the handling completion keyword is input (NO at step S85). When the handling completion keyword has been input (YES at step S85), the procedure proceeds to step S87.

At step S87, the sound recognition device 6B transmits a command to the controller 3 so as to bring the food work device 2 into operation waiting state. Then, the flow of this procedure ends.

5-3. Learn History and/or Details of Trouble-Shooting

The sound recognition device 6 may learn a history and/or details of trouble-shooting motion failures. For example (not illustrated), there may be a case where a motion failure is handled by a method of handling different from the method of handling obtained from the motion failure handling processing. For further example (not illustrated), there may be a case where the motion failure to be handled is a new kind of motion failure that has never been handled before. In these cases, when the worker inputs a sound including a handling completion keyword into the sound input device 5, the sound may also include a history associated with the method of handling and/or a method of handling the method of handling. The content of the input from the worker may accumulate in the handling method database 20 in correlation with an alarm and details of the motion failure. This enables the sound recognition device 6 to learn troubleshooting.

6. Example Hardware Configuration of Sound Recognition Device

By referring to FIG. 10, description will be made with regard to an example hardware configuration of the sound recognition device 6 (6A, 6B) that implements the processings performed by the above-described processing parts and execution parts, which are implemented by programs performed by the CPU 901.

Figure 10:
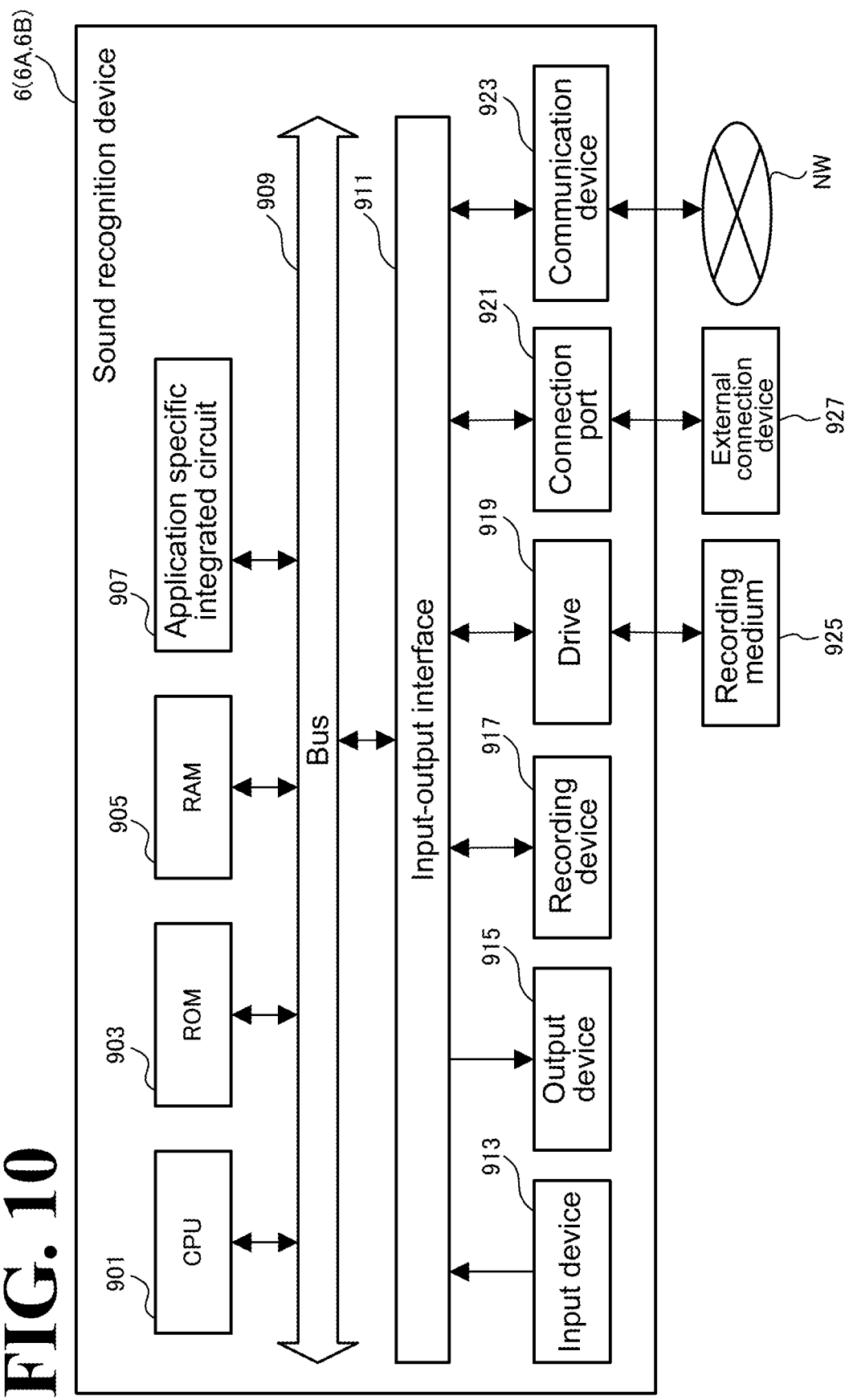
FIG. 10 is a block diagram illustrating an example hardware configuration of the sound recognition device.

As illustrated in FIG. 10, the sound recognition device 6 (6A, 6B) includes the CPU 901, a ROM 903, a RAM 905, an application specific integrated circuit 907, an input device 913, an output device 915, a recording device 917, a drive 919, a connection port 921, and a communication device 923. Examples of the application specific integrated circuit 907 include, but are not limited to, an application specific integrated circuit (ASIC) and a field-programmable gate array (FPGA). These configurations are connected to each other through a bus 909 and an input-output interface 911 so that signals are transmittable to and from the configurations.

The programs may be stored in, for example, the ROM 903, the RAM 905, or the recording device 917.

In another possible embodiment, the programs may be stored in a removable recording medium 925 temporarily or permanently. Examples of the recording medium 925 include, but are not limited to, a magnetic disc such as a flexible disc; an optical disc such as a compact disc (CD), a magneto-optical (MO) disc, and a digital video disc (DVD); and a semiconductor memory. The recording medium 925 may be provided in the form of "packaged software". In this case, the programs stored in the recording medium 925 may be read by the drive 919 and stored in the recording device 917 through devices such as the input-output interface 911 and the bus 909.

In another possible embodiment, the programs may be stored in a download site or any other recording device such as a computer (not illustrated). In this case, the programs are transmitted to the communication device 923 through a network NW. Examples of the network NW include, but are not limited to, a local area network (LAN) and the Internet. Then, the programs received by the communication device 923 are stored in the recording device 917 through devices such as the input-output interface 911 and the bus 909.

In another possible embodiment, the programs may be stored in an external connection device 927. In this case, the programs are transmitted through the connection port 921 and stored in the recording device 917 through devices such as the input-output interface 911 and the bus 909.

Then, the CPU 901 performs various kinds of processing based on the programs stored in the recording device 917 so as to implement the processings performed at the processing parts and execution parts. In performing the programs, the CPU 901 may read the programs directly from the recording device 917 or may temporarily load the programs in the RAM 905. When the CPU 901 receives the programs through devices such as the communication device 923, the drive 919, and the connection port 921, the CPU 901 may execute the programs without storing the programs in the recording device 917.

As necessary, the CPU 901 may perform the various kinds of processing based on signals or information input through the input device 913, such as a mouse, a keyboard, and a microphone (not illustrated).

Then, the CPU 901 may output results of the processings from the output device 915, such as a display device and a sound output device. As necessary, the CPU 901 may send results of the processings through the communication device 923 and the connection port 921 and store the results of the processings in the recording device 917 and/or the recording medium 925.

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A food processing system, comprising:
    a food work device configured to perform predetermined work on a food;
    controller circuitry configured to control the food work device;
    a sound input device configured to receive a sound made by a worker; and
    sound recognition circuitry configured to obtain and recognize the input sound and configured to, based on the recognized input sound, instruct the controller circuitry to control the food work device to perform predetermined processing, wherein
    the sound recognition circuitry further comprises keyword determination processing circuitry configured to determine whether the recognized input sound includes a keyword associated with a motion failure of the food work device.

2. The food processing system according to claim 1, further comprising:
    a display configured to display an operation screen associated with an operation of the food work device controlled by the controller circuitry, wherein
    the sound recognition circuitry further comprises
        first keyword determination processing circuitry configured to determine whether the recognized input sound includes a first keyword associated with a screen update of the display, and
        first processing execution circuitry configured to, when the recognized input sound includes the first keyword, cause the controller circuitry to perform the screen update of the display which updates the operation screen to a first keyword screen corresponding to the first keyword.

3. The food processing system according to claim 2, wherein
    the keyword is a second keyword, and
    the sound recognition circuitry further comprises second processing execution circuitry configured to, when the second keyword is included in the recognized input sound, cause the controller circuitry to display on the display a method of handling the motion failure.

4. The food processing system according to claim 3, wherein the sound recognition circuitry further comprises alarm determination processing circuitry configured to determine whether the controller circuitry is raising an alarm, the second processing execution circuitry is configured to obtain the method of handling based on alarm information from the controller circuitry, when the controller circuitry is raising an alarm, and when the controller circuitry is not raising an alarm, the second processing execution circuitry is configured to request additional information from the worker and configured to obtain the method of handling based on the additional information.

5. The food processing system according to claim 4, wherein the sound recognition circuitry comprises third keyword determination processing circuitry configured to determine whether the recognized input sound includes a third keyword associated with operation control of the food work device, and third processing execution circuitry configured to, when the recognized input sound includes the third keyword, cause the controller circuitry to perform operation control.

6. The food processing system according to claim 4, wherein the sound recognition circuitry further comprises sound synthesis processing circuitry configured to synthesize a sound indicating content associated with the processing performed by the controller circuitry, and the food processing system further comprises sound output circuitry configured to output the sound synthesized by the sound synthesis processing circuitry.

7. The food processing system according to claim 3, wherein the sound recognition circuitry further comprises third keyword determination processing circuitry configured to determine whether the recognized input sound includes a third keyword associated with operation control of the food work device, and third processing execution circuitry configured to, when the recognized input sound includes the third keyword, cause the controller circuitry to perform the operation control.

8. The food processing system according to claim 3, wherein the sound recognition circuitry further comprises sound synthesis processing circuitry configured to synthesize a sound indicating content associated with the processing performed by the controller circuitry, and the food processing system further comprises sound output circuitry configured to output the sound synthesized by the sound synthesis processing circuitry.

9. The food processing system according to claim 2, wherein the sound recognition circuitry further comprises third keyword determination processing circuitry configured to determine whether the sound that has been recognized includes a third keyword associated with operation control of the food work device, and a third processing execution circuit configured to, when the recognized input sound includes the third keyword, cause the controller circuitry to perform the operation control.

10. The food processing system according to claim 2, wherein the sound recognition circuitry further comprises sound synthesis processing circuitry configured to synthesize a sound indicating content associated with the processing performed by the controller circuitry, and the food processing system further comprises sound output circuitry configured to output the sound synthesized by the sound synthesis processing circuitry.

11. The food processing system according to claim 1, further comprising:

a display configured to display a screen associated with control of the food work device by the controller circuitry, wherein the keyword is a second keyword, and the sound recognition circuitry further comprises second processing execution circuitry configured to, when the recognized input sound includes the second keyword, cause the controller circuitry to display, on the display, a method of handling the motion failure.

12. The food processing system according to claim 11, wherein the sound recognition circuitry includes alarm determination processing circuitry configured to determine whether the controller circuitry is raising an alarm, the second processing execution circuitry is configured to obtain the method of handling based on alarm information from the controller circuitry, when the controller circuitry is raising an alarm, and when the controller circuitry is not raising an alarm, the second processing execution circuitry is configured to request additional information from the worker and configured to obtain the method of handling based on the additional information.

13. The food processing system according to claim 12, wherein the sound recognition circuitry further comprises third keyword determination processing circuitry configured to determine whether the recognized input sound includes a third keyword associated with operation control of the food work device, and third processing execution circuitry configured to, when the recognized input sound includes the third keyword, cause the controller circuitry to perform the operation control.

14. The food processing system according to claim 12, wherein the sound recognition circuitry further comprises sound synthesis processing circuitry configured to synthesize a sound indicating content associated with the processing performed by the controller circuitry, and the food processing system further comprises sound output circuitry configured to output the sound synthesized by the sound synthesis processing circuitry.

15. The food processing system according to claim 11, wherein the sound recognition circuitry further comprises third keyword determination processing circuitry configured to determine whether the recognized input sound includes a third keyword associated with operation control of the food work device, and third processing execution circuitry configured to, when the recognized input sound includes the third keyword, cause the controller circuitry to perform the operation control.

16. The food processing system according to claim 11, wherein the sound recognition circuitry further comprises sound synthesis processing circuitry configured to synthesize a sound indicating content associated with the processing performed by the controller circuitry, and the food processing system further comprises sound output circuitry configured to output the sound synthesized by the sound synthesis processing circuitry.

17. The food processing system according to claim 1, wherein the sound recognition circuitry further comprises third keyword determination processing circuitry configured to determine whether the recognized input sound includes a third keyword associated with operation control of the food work device, and third processing execution circuitry configured to, when the recognized input sound includes the third keyword, cause the controller circuitry to perform the operation control.

18. The food processing system according to claim 17, wherein the sound recognition circuitry further comprises sound synthesis processing circuitry configured to synthesize a sound indicating content associated with the processing performed by the controller circuitry, and the food processing system further comprises sound output circuitry configured to output the sound synthesized by the sound synthesis processing circuitry.

19. The food processing system according to claim 1, wherein the sound recognition circuitry further comprises sound synthesis processing circuitry configured to synthesize a sound indicating content associated with the processing performed by the controller circuitry, and the food processing system further comprises sound output circuitry configured to output the sound synthesized by the sound synthesis processing circuitry.

20. The food processing system according to claim 1, further comprising:

sight direction detection circuitry configured to detect a sight direction of the worker, wherein the sound recognition circuitry further comprises fourth keyword determination processing circuitry configured to determine whether the recognized input sound includes a fourth keyword associated with a vague instruction term, and target identification processing circuitry configured to, when the recognized input sound includes the fourth keyword, identify a processing target based on the detected sight direction.

* * * * *